SAMPLE A

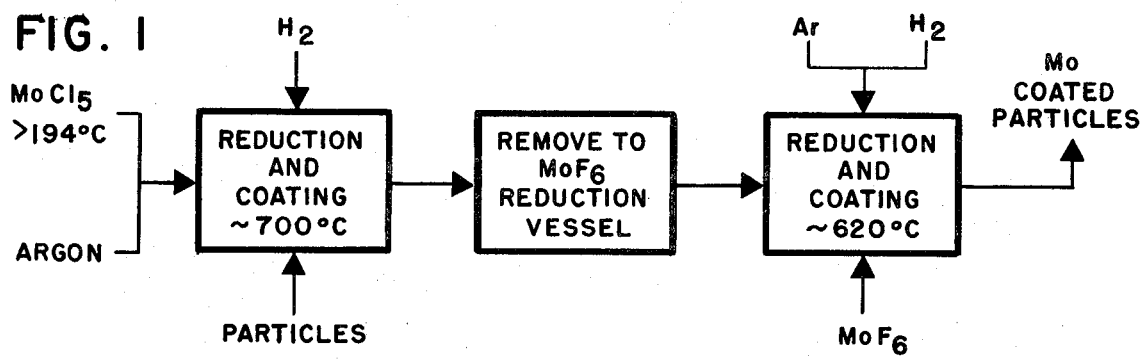
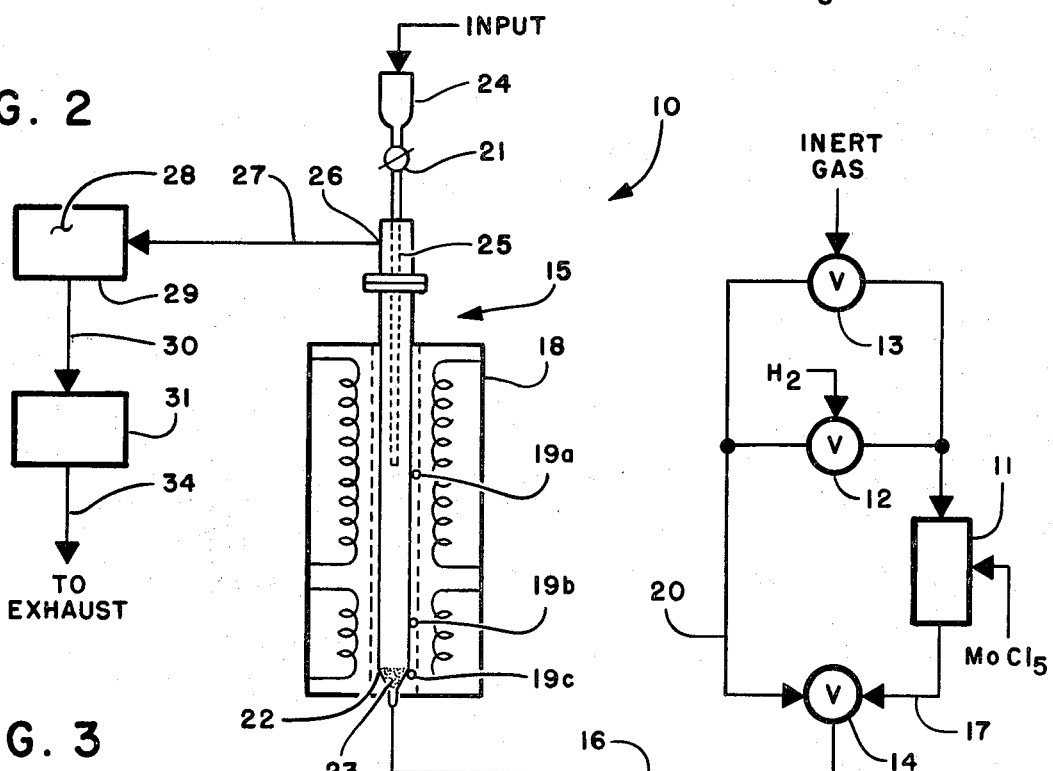
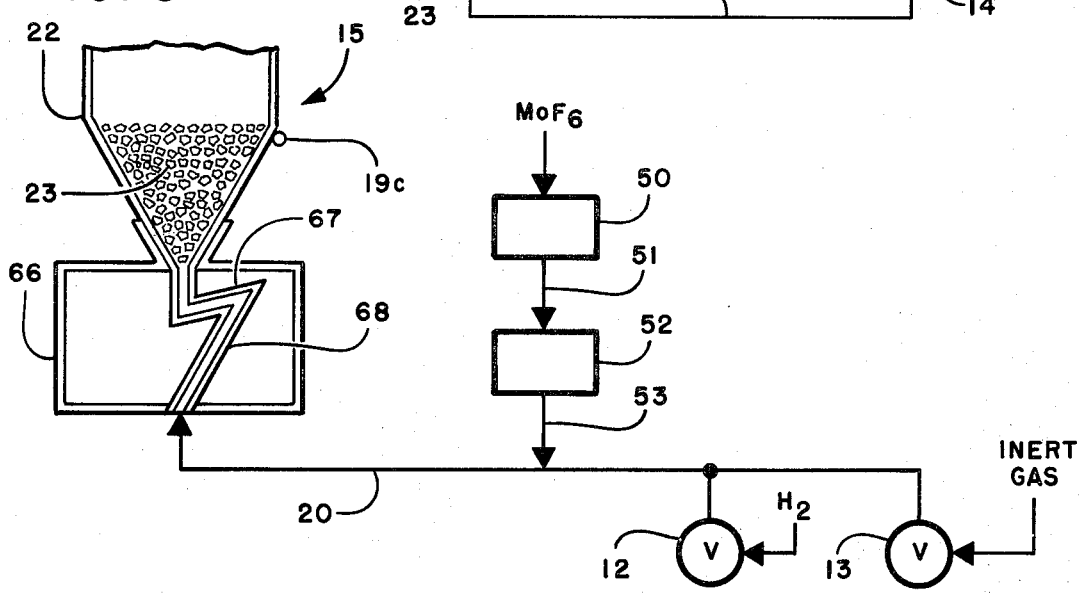

SAMPLE B

United States Patent Office 3,796,589
Patented Mar. 12, 1974

3,796,589
METHOD OF VAPOR SEAL COATING PLUTONIUM OXIDE PARTICLES WITH MOLYBDENUM
Anthony F. Ciramella and Ralph R. Jaeger, Dayton, and Ronald R. Rogers, Centerville, Ohio, assignors to the United States of America as represented by the United States Atomic Energy Commission
Filed July 28, 1972, Ser. No. 276,212
Int. Cl. C23c 11/02
U.S. Cl. 117—71 R     5 Claims

ABSTRACT OF THE DISCLOSURE

A method for applying a molybdenum (Mo) coating for actinide ceramic materials comprising reducing molybdenum pentachloride ($MoCl_5$) in the presence of the ceramic material so as to deposit a first part of the Mo coating and then reducing molybdenum hexafluoride ($MoF_6$) in the presence of the coated ceramic material to deposit a second part of the Mo coating.

BACKGROUND OF INVENTION

The application of actinide metal cermet fuels or fuel discs for isotopic generators or other isotopic power fuel applications requires that maximum efficiency, thermal conductivity, and safety features be sought for this type of fuel application. The use of Mo coatings will provide improved thermal conductitivy thereby reducing centerline temperature of heat source and reducing compatibility problems with other materials at these temperatures. Further, Mo coatings reduce the surface area of plutonium oxide exposed to the environment under any type of accident conditions thereby providing a measure of safety. However, currently used Mo depositions methods have inherent problems; (1) the rate of coating deposition in some processes is so slow that in order to achieve an adequate coating thickness requires inordinately long process times (such as by deposition of Mo on the ceramic substrate by reduction of $MoCl_5$) or (2) the coating applied may itself cause an increase in neutron emission rate (such as when Mo is deposited on the ceramic substrate by reduction of $MoF_6$ wherein the neutron emission rate is increased by the resulting fluoride impurity due to the $^{19}F$ ($\alpha,n$), $^{22}Na$ reaction). Because of these and similar drawbacks, a suitable efficient method for depositing Mo on actinide ceramic particles has not been developed. The invention provides a practical and economical process for overcoming these drawbacks.

SUMMARY OF INVENTION

It is an object of this invention to provide a method of coating with Mo actinide ceramic materials used in isotopic generators and in like applications.

It is a further object of this invention to provide a method of Mo coating actinide ceramic materials, which method is efficient and rapid in its application, and which method does not substantially increase neutron emission rate of the coated actinide ceramic material.

It is a further object of this invention to provide a method of coating actinide ceramic materials from fluoride containing starter materials and not substantially increase neutron emission rates.

The invention comprises depositing a first thin Mo coating or part of a coating using $MoCl_5$ reduction to seal the ceramic particle surface and then depositing a second Mo coating or part of a coating on said first part of the coating using $MoF_6$ hydrogen reduction to achieve the desired thickness.

Various other objects, features and advantages are listed in the specification and appended claims and will be apparent to those skilled in the art. It is understood that various changes in the details, materials and arrangements may be made to the invention as described and illustrated in the description and claims by those skilled in the art without leaving the scope of the invention as listed in the appended claims.

DECRIPTION OF DRAWING

FIG. 1 illustrates one embodiment of a flow sequence which may be used for implementing this invention.

FIG. 2 is a schematic of apparatus for Mo reduction and deposition using $MoCl_5$.

FIG. 3 is an enlarged view of the lower part of reaction chamber apparatus for $MoF_6$ reduction and deposition of Mo.

DETAILED DESCRIPTION

Figure 5:
FIG. 5 illustrates a cross-section of Mo coated, irregularly shaped plutonium-238 oxide ($^{238}PuO_2$) particles or shards which have surface connected internal porosity.

Referring to FIG. 1, a typical flow sequence indicating the general steps which may be used in this process is shown. This process includes and will be described herein as a sequential and separate reduction of first $MoCl_5$ and second $MoF_6$ gas on actinide ceramic material or particles. It may be preferred that the actinide ceramic material comprise a mass of particles of diameters from about 105 microns to about 250 microns. Apparatus 10 for the reduction of Mo from $MoCl_5$ is shown diagrammatically in FIG. 2 and includes a vaporizer 11 having an initial quantity or charge of $MoCl_5$ disposed therein in solid form from which $MoCl_5$ vapors may be evolved by heating in the vaporizer 11 to temperatures of from about 150° C. to about 250° C., and preferably from about 200° C. to about 220° C. Hydrogen and argon or other suitable inert gas may be fed at predetermined rates into a vaporizer 11 by proper positioning of valves 12 and 13 respectively, depending upon such variables as the desired rate of reduction of Mo, the quantity of $MoCl_5$ in the vaporizer, and the point in the coating sequence at which one is operating, etc., to convey the $MoCl_5$ vapors through valve 14 to a suitable reaction chamber 15. Although hydrogen may be used exclusively as carrier gas for flowing the vaporized $MoCl_5$, this may have the effect of limiting the number of runs that may be performed before cleaning the vaporizer 11 since the remaining $MoCl_5$ may be reduced to the red, much less volatile molybdenum trichloride ($MoCl_3$). This may result in greatly reduced $MoCl_5$ transfer. This problem may be eliminated or minimized by using argon or other suitable inert gas as a carrier gas. Use of argon may permit numerous runs from one charging of the vaporizer. The vaporizer 11 may be made of any suitable material and of a size suitable for the size loads to be produced. A vaporizer made of nickel plated copper and having chamber internal dimensions of about 5 inches in diameter by about 6 inches in height has been used with good success. The vaporizer may include, for convenience in handling, a stainless steel or other suitable material beaker (not shown) to hold the $MoCl_5$ charge inside the vaporizer. Both the vaporizer and all $MoCl_5$ lines should be kept above 200° C. by suitable heating means (not shown) and preferably above 220° C., to prevent or minimize condensation of the vaporized $MoCl_5$.

The reaction chamber 15 may be made of any suitable material such as nickel, Monel, or stainless steel as long as the reaction materials are not affected, and may be of a size satisfactory for coating the load to be employed in a fluidized bed type of operation. A reaction chamber which may be used satisfactorily for coating from about 200 to about 230 gram batches of actinide ceramic materials using the $MoCl_5$ process may be made of a high nickel alloy, may be about 23 inches long, and may have an about 1.5 inch internal diameter. Suitable means 18, such as a two zone electric furnace as shown in FIG. 2, may be used to heat the reaction chamber 15 to the required deposition temperature. A suitable number of thermocouples 19a, 19b, 19, if desired, may be placed on the reaction chamber 15 to monitor the temperature of the chamber 15 and its contents (i.e., the fluidized bed). FIGS. 2 and 3 show the actinide ceramic particles in a fluidized and agitated state. It is to be understood that the size of the particles or shards is exaggerated for the sake of illustration, and that the hight of the bed may be at a different level depending upon the charge quantity. Depending upon the design of the reaction chamber used, the point of temperature monitoring and control will vary. However, it may be preferred that the thermocouple 19c located at the bottom area 22 of the reaction chamber (i.e., thermocouple 19c located where the conical section starts at the bottom of reaction chamber 15 as shown in FIG. 2) be used to monitor the coating or bed temperature. At this location the temperature of the fluid bed containing the mass of actinide ceramic particles may be maintained at between about 600° C. and about 900° C. By monitoring the temperature at the point indicated as the bottom location 22, coating efficiencies may be easily and accurately predicted. Introduction of the $MoCl_5$ vapor carried by a suitable inert gas and the hydrogen gas at a point beneath chamber 15 and beneath the mass of particles agitates and fluidizes this mass. The substrate actinide ceramic particles 23 may be introduced through suitable means 24 such as a feeder located at the top of reaction chamber through a conduit 25 extending between about ⅓ to ½ of the way into reaction chamber 15. The length of conduit 25 aids in bypassing the exhaust port 26 and in preventing concurrent loss of particles. The actinide ceramic particles may be coated while in the fluidized state.

An exhaust gas system may also be provided to remove elutriated actinide ceramic particles 23 or shards and hydrogen chloride gas from the gas stream. This exhaust gas system may include a pipe or conduit 27 allowing passage of gas and elutriated ceramic materials from the reaction chamber into a copper wool 28 filled filter 29, a pipe or conduit 30, a water or other suitable scrubber 31 and finally appropriate exhaust means 34. The coated particles may be removed as described hereinafter.

The $MoCl_5$ reduction and coating steps shown in FIG. 1 is performed by flowing hydrogen and/or an inert gas to conduits 20 and 16 and reaction chamber 15 to purge the system, heating vaporizer 11 to a temperature to vaporize the $MoCl_5$ charge, and then flowing hydrogen and vaporized $MoCl_5$ with argon or other suitable inert gas serving as carrier gas through appropriate conduits 17 and reaction chamber 15 for a suitable length of time to again purge the system of other materials which may adversely affect the reaction or contaminate the substrate prior to molybdenum deposition. The carrier gas carries the vaporized $MoCl_5$ through appropriate paths. The length of time for the purge will depend upon the volume of the reaction chamber 15 and assorted exhaust equipment as well as other factors which may influence the reaction.

The actinide ceramic particles 23 may then be introduced after the reaction chamber has been purged with the hydrogen and vaporized $MoCl_5$ with any gas carrier which is inert to this system, such as helium and argon or mixtures thereof. The batch weight of ceramic particles, such as plutonium dioxide, which may be introduced into the reaction chamber with dimensions as specified above is about 200 to about 230 grams. During the Mo coating using apparatus above described, hydrogen flow may be maintained at about 12 cubic feet per hour (c.f.h.) and argon flow through the vaporizer at about 4 c.f.h. Of, course, optimum coating parameters will vary depending upon size of chamber 15, amount of $MoCl_5$, etc. The size of the particles, shard, or articles to be coated may vary depending upon the use to be made of the material and the type of equipment used, but sizes which have been satisfactorily coated one between 105 microns and 250 microns. Molybdenum pentachloride vapors carried by a suitable carrier gas and hydrogen gas may be introduced to the cone bottom passing through the heated actinide ceramic particle bed and fluidizing said bed for the hydrogen reduction process of $MoCl_5$. The first part coated actinide ceramic particles may thereafter be removed from reaction chamber 15 by suitable means, such as vacuum aspiration, by removing the feeder 24 and aspirating the coated particles through the top of chamber 15.

A summary of conditions typical for any given run of $MoCl_5$ reduction where equipment used has dimensions described earlier is given in Table I. It should be understood that parameters and ranges cited must be manipulated or coordinated to achieve optimum results.

TABLE I

|  | Preferred parameters | Ranges |
|---|---|---|
| Weight of ceramic substrate such as $PuO_2$, grams | 200–230 |  |
| Temperature of fluid bed at bottom location 22, ° C | ~700 | ~600–~900 |
| Temperature of vaporizer, ° C | ~220 | ~150–~250 |
| Hydrogen flow through fluid bed, c.f.h | ~12 | ~10–~20 |
| Argon flow through vaporizer, c.f.h | ~4 | ~1–~5 |
| Size of particles, microns | 105–250 |  |
| Rate of deposition, grams per minute | ~0.05 |  |
| Efficiency, percent | >80 |  |

NOTE.—~=about.

As shown in FIG. 1 after the $MoCl_5$ reduction and coating step described above, the Mo coated ceramic particles which contain from about 15% to about 20% coating thickness by weight Mo of the final coating thickness and which first part coating thickness is from about 0.9 microns to about 1.2 microns, may be coated by the hydrogen reduction process of $MoF_6$ as will be described hereinbelow by removing the first part coated particles from the reaction chamber 15 and placing them in a similar apparatus as that used in FIG. 2 for coating of molybdenum on the precoated particles, using in this second part of the invention hydrogen reduction of $MoF_6$ process. The type of apparatus used for the $MoF_6$ process differs from that of the $MoCl_5$ process primarily in that the vaporizer is omitted and in the trap 67 and cooling block 66 used in the $MoF_6$ process as will be discussed hereinafter. Although similar apparatus is required for the $MoF_6$ process it may not be feasible to use the same equipment as used in the $MoCl_5$ process primarily because of the introduction of fluorine impurities which may contaminate subsequent batches of $PuO_2$ when applying the first part of the Mo coating using the $MoCl_5$ process. In FIG. 3, suitable regulating means 52 such as a mass flowmeter or other suitable device is used to regulate the flow of $MoF_6$ through conduit 51 from a reservoir or other storage container 50. The line or conduit 53 leading from the regulating means 52 merges into conduit or line 20 which is used to transport or carry an inert gas such as argon or helium and hydrogen from suitable supply tanks or containers (not shown). Appropriate flow regulating valve means 12, 13 are used to control the hydrogen and argon gas flow.

The gas flow proceeds through cooling block 66 containing a capillary or similar suitable diameter size tube 68 with a trap 67 on the capillary 68 to prevent passage of ceramic particles into the gas flow lines. Cooling block 66 may also serve to cool the capillary area and reduce the potential for reaction in that area which might ultimately cause plugging after continued use. The bed temperature may be controlled, as in the MoCl₅ process described above and in FIG. 2, by the thermocouple 19c located at the upper cone initiation point 22. Aside from the differences shown in FIG. 3, the remainder of the chamber, heating means, exhaust system, etc., are identical to those in FIG. 2 and are therefore not duplicated again in the drawings.

Using a reaction chamber with the same dimensions as that described above and in FIG. 2, the following parameters shown in Table II may be taken as typical for the MoF₆ reduction process.

TABLE II

|  | Preferred parameters | Range |
|---|---|---|
| H₂ flow | ~16 c.f.h. | About 12 c.f.h. to about 24 c.f.h. |
| MoF₆ flow | ~1.2 g.p.m. | About 0.5 g./min. to about 1.7 g./min. |
| Temperature | ~620° C. | ~580° C. to ~700° C. |
| Rate of deposition | ~0.5 g./min. | About 0.2 g./min. to about 0.7 g./min. |
| Batch | 200–230 grams | |
| Particle size | 105–250 microns.g. | |
| Efficiency | ~90% | |

NOTE.—~=about.

As in the apparatus employed in the MoCl₅ process as shown in FIG. 2, the coated particles may be removed as described hereinabove by vacuum aspiration or other suitable means. The feeder inlet conduit or pipe 25 and feeder 24 permit loading the precoated particles into the reaction chamber without opening the system after coating conditions have been established. In a typical coating series using the MoF₆ process, the apparatus would first be purged using argon and the parts requiring heating would be heated to the desired temperature. This heating step includes heating the reaction chamber 15 as well as the MoF₆ gas. Coating conditions may then be set up at from about 0.5 grams per minute (g./min.) to about 1.7 g./min. of MoF₆ and maintained for about 10 minutes before introduction of the first part coated actinide ceramic particles which are maintained and heated in a fluidized and agitated state by introducing the gases beneath the mass.

Thermocouple 19c temperature is to be maintained about constant at between about 580° C. and 700° C. and preferably about 620° C. during and after the introduction of the ceramic particles. After a suitable predetermined period after the desired amount of MoF₆ gas has been introduced into the system, the MoF₆ gas flow may then be stopped. The MoF₆ feed rate may be variable depending upon quantity of ceramic particles in the reaction chamber 15, the flow required to maintain the actinide ceramic particle mass in a fluidized state, the coating rate desired (such as 0.5 g./min. of Mo) and other factors. The bed may be maintained at temperature of between about 580° C. and 700° C. for a suitable continued length of time such as between about 0.25 hours and 1 hour with hydrogen flow to remove fluorine contamination from the coated surface of the actinide ceramic particles or articles. The combined molybdenum coating thickness may be between about 4 microns and about 10 microns, and may then be removed as described hereinabove from the reaction chamber 15 through suitable means (not shown) such as by vacuum aspiration. The removed particles now have virtually no objectionable fluoride contamination.

The coating of actinide ceramic particles using the hydrogen reduction of MoF₆ process without first coating with Mo using the MoCl₅ process results in an objectionable increase in the neutron emission rate by a factor of two or greater as a result of fluorine contamination. Generally this increase results not only because of the presence of the fluorine within the body and on the surface of the actinide ceramic particles or shards, but also because of the formation of actinide tetrafluoride and trifluoride compounds or other fluoride containing actinide species which themselves are neutron emitters. This drawback of increase in neutron emission rate is deemed sufficiently objectionable to negate the advantages of the MoF₆ process se—which advantages include (for MoF₆ processes) uniform and high density deposits as well as high molybdenum deposition rates. Under optimum conditions for the MoCl₅ and MoF₆ processes, the MoF₆ process is approximately 10 times faster than the MoCl₅ process.

This invention describes a procedure which makes full use of these advantages but does not have the drawbacks cited. It has been found that a thin coating of molybdenum, ranging between 0.9 and 1.2 microns thick, using the hydrogen reduction process of MoCl₅, may be applied to the actinide ceramic particles without increasing the neutron emission rate. The resulting chlorine contamination may be easily removed to less than about 100 p.p.m. (or 0.01% by weight), through outgassing techniques such as heating in a suitable means such as an electric furnace in an inert atmosphere at an elevated temperature (between about 1000° C. and 1600° C.) for a suitable length of time such as between about 0.5 hours and about 1 hour dependent upon the temperature used. To illustrate, two samples were Mo coated using the hydrogen reduction of MoCl₅ process exclusively. Sample A had 6.31% by weight Mo and Sample B had 7.28% by weight Mo. Before outgassing Sample A had 0.27% by weight chlorine and Sample B had 0.25% by weight chlorine. After 30 hours at 1600° C. in an inert atmosphere, Sample A had 0.012% by weight chlorine and Sample B had 0.013% by weight chlorine. Using the process and equipment as described herein, runs have been successfully made to deposit Mo from MoCl₅ wherein in 70 gram batches, the final coating of the coated product consisted of about 15.4 weight percent Mo having about 0.21 weight percent chlorine on actinide ceramic substrates such as uranium oxide, plutonium oxide and plutonium oxidethorium oxide solid solution. Several actinide ceramic samples which had been coated by the MoCl₅ process as described first were overlaid with additional Mo by the MoF₆ process. Table III illustrates the reduced fluoride contamination obtained by first partially coating the substrate surface by the MoCl₅ process.

Figure 4:
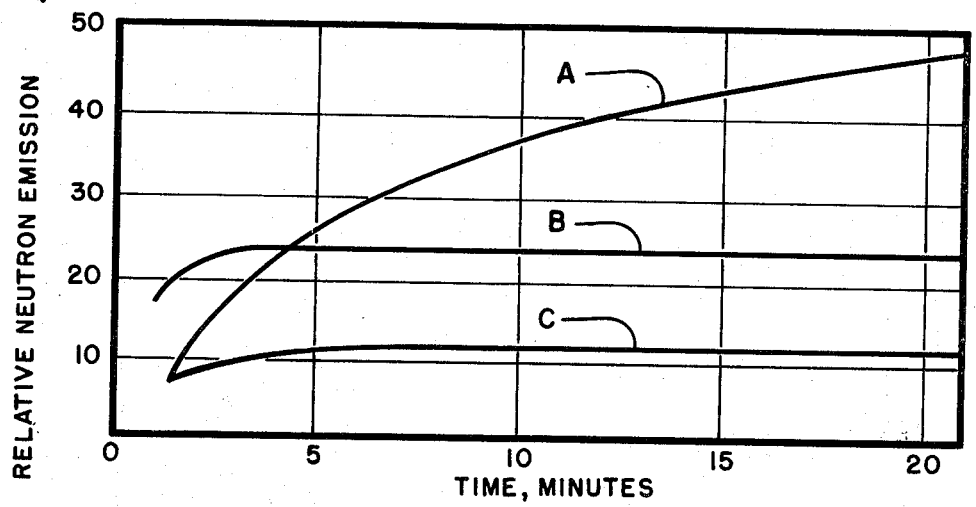
FIG. 4 illustrates neutron flux as a function of time for various samples during Mo deposition from $MoF_6$.

FIG. 4 depicts neutron flux as a function of time for various samples having a Mo coating and varying fluoride (F⁻) contamination. Sample A which had 16.8 weight percent (w./o.) Mo and 2.55 w./o. F⁻ after coating, resulted in 17.9 factor increase in total neutron emission. Sample B which had a 17.9 w./o. Mo and 0.56 w./o. F⁻ resulted in a 4.7 factor increase in total neutron emission, which factor increase leveled off after about 5 minutes, and Sample C, which had a 1.4 w./o. Mo and 0.20 w./o F⁻ resulted in a 2.3 factor increase in total emission. This shows that a decreasing fluoride content is accompanied by a decrease in total neutron emission factor. Samples B and C may be protected by a 3–4 weight percent Mo coating by the MoCl₅ process allowing any subsequently deposited amount of Mo by the fluoride (MoF₆) process without appreciable increase in the neutron flux.

TABLE III.—FLUORINE CONTAMINATION AS A FUNCTION OF SURFACE PROTECTION

[Percent]

| Mo deposited by chloride reduction | Total Mo | F⁻ | Mo deposited by chloride reduction | Total Mo | F⁻ |
|---|---|---|---|---|---|
| 0.0 | 10.7 | 2.07 | 1.6 | 23.8 | 0.35 |
| 0.0 | 17.9 | 1.93 | 6.7 | 23.8 | 0.12 |
| 0.0 | 26.0 | 1.4 | 6.3 | 27.8 | 0.07 |
| 0.9 | 20.4 | 0.14 | 7.3 | 20.9 | 0.07 |

Figure 6:
FIG. 6 illustrates a cross-section of Mo coated irregularly shaped plutonium-238 oxide-thorium oxide ($^{238}PuO_2$-$ThO_2$) solid solution particles or shards.

In summary, it has been found that by depositing from about 2 to about 10 percent by weight of the total Mo coating using the hydrogen reduction of MoCl₅ process, and then completing the coating deposition using the faster MoF₆ method (MoCl₅—rate of deposition about 0.03 g./min. to about 0.06 g./min.; MoF₆—rate of deposition about 0.20 g./min. to about 0.70 g./min.), the increase in neutron count may be prevented or minimized. Flouride contamination after coating has been reduced to less than about 0.07% by weight of the final coating. FIGS. 5 and 6 illustrate particles which have been coated using the process of this invention. The coating may be uniform, dense, and may permeate all exposed surfaces. FIG. 5 represents irregularly shaped $^{238}PuO_2$ particles at 250×. It should be noted that with particles having the porosity of those particles in FIG. 5, that is particles having surface connected porosity, there is greater likelihood that there be a greater neutron emission rate with the $MoF_6$ process even after the initial $MoCl_5$ process because of the large surface area within the particles themselves which may not be coated thoroughly or evenly with the $MoCl_5$ process. It is advisable therefore that the particles to be used have high density and low or minimal porosity surface area. FIG. 6 represents irregularly shaped 238 $PuO_2$- $ThO_2$ solid solution particles at 250× wherein there is internal porosity which is not connected to the surface. Consequently there is a greater thickness buildup of Mo coating in the initial $MoCl_5$ process so that if there is any fluorine contamination it will occur only at the beginning (when the $MoF_6$ process is initially started), that is, about the first three or four percent molybdenum, and then it will level off as shown in Sample B, FIG. 4. Sample A of FIG. 4 corresponds with FIG. 5 and in accordance with the surface connected porosity explanation hereinabove, line A shows a continual increase in neutron emission relative to time. Sample C would be typical for particles coated evenly and thoroughly, wherein the particles have low porosity and a minimum of surface connected porosity.

Using this invention, 2.1 hours were used in depositing 6 micron thick Mo coating and resulted in only increasing the neutron emission rate from 13,000 to 15,000 neutrons/second/gram (n./s./g.) of $^{238}Pu$, while this would have taken about 15.6 hours using the prior art $MoCl_5$ process.

What is claimed is:

1. Method for applying a molybdenum coating on plutonium dioxide material comprising heating solid molybdenum pentachloride to a temperature of from about 150° C. to about 250° C. forming molybdenum pentachloride vapor, introducing said molybdenum pentachloride vapor and hydrogen gas into a reaction chamber in the presence of plutonium dioxide material, heating the plutonium dioxide material while in the presence of said vapor and gas to temperature of from about 600° C. to about 900° C. to effect reduction of molybdenum from the molybdenum pentachloride and deposition of molybdenum metal as the first part of a molybdenum coating on said plutonium dioxide material, and containing said deposition to achieve a thickness of form about 0.9 microns to about 1.2 microns, thereafter heating said molybdenum first part coated plutonium dioxide material to a temperature of from about 1000° C. to about 1600° C. and maintaining at temperature for about 0.5 hours to about 1 hour to reduce chloride content of the coated plutonium dioxide material to less than about 100 parts per million, thereafter introducing molybdenum hexafluoride gas and hydrogen gas into the presence of said molybdenum first part coated plutonium dioxide material, heating said coated material while in the presence of said latter-mentioned gases to from about 580° C. to about 700° C. effecting reduction of molybdenum from the molybdenum hexafluoride and depositing said reduced molybdenum metal on said first part of molybdenum coating as a second part of said molybdenum coating, and continuing said latter depositing and forming a combined molybdenum coating thickness of from about 4 microns to about 10 microns, thereafter heating said combined molybdenum coated plutonium dioxide material at between about 580° C. and about 700° C. for from about 0.25 to about 1 hour to remove fluorine contamination.

2. The method of claim 1 wherein said plutonium dioxide materials comprise a mass of particles of diameters from about 105 microns to about 250 microns.

3. The method of claim 2 including introducing the molybdenum pentachloride vapor and hydrogen gas beneath said mass of particles to agitate and fluidize the same, effecting said first part coating while in fluidized state, thereafter introducing the molybdenum hexafluoride gas and hydrogen gas beneath said mass of first part coated particles to agitate and fluidize the same, and effecting said second part coating while in fluidized state.

4. The method of claim 3 including a carrier gas into said molybdenum pentachloride vapor for introducing the molybdenum pentachloride vapor, said carrier gas taken from the group consisting of helium, argon and mixtures thereof.

5. The method of claim 1 including heating said plutonium dioxide material to said temperature prior to introducing said molybdenum pentachloride vapor and hydrogen gas.

References Cited
UNITED STATES PATENTS

| | | | |
|---|---|---|---|
| 3,442,690 | 5/1969 | Peake et al. | 117—100 B |
| 3,440,085 | 4/1969 | Baker et al. | 117—100 B |
| 3,166,614 | 1/1965 | Taylor | 117—100 B |
| 3,501,337 | 3/1970 | Lindgren et al. | 117—107.2 |
| 3,544,359 | 12/1970 | Oxley | 117—107.2 |
| 3,515,583 | 6/1970 | Inoue et al. | 117—107.2 |

ALFRED L. LEAVITT, Primary Examiner

J. W. MASSIE, Assistant Examiner

U.S. Cl. X.R.
117—100 B, 107.2 R